United States Patent Office 3,242,605
Patented Mar. 29, 1966

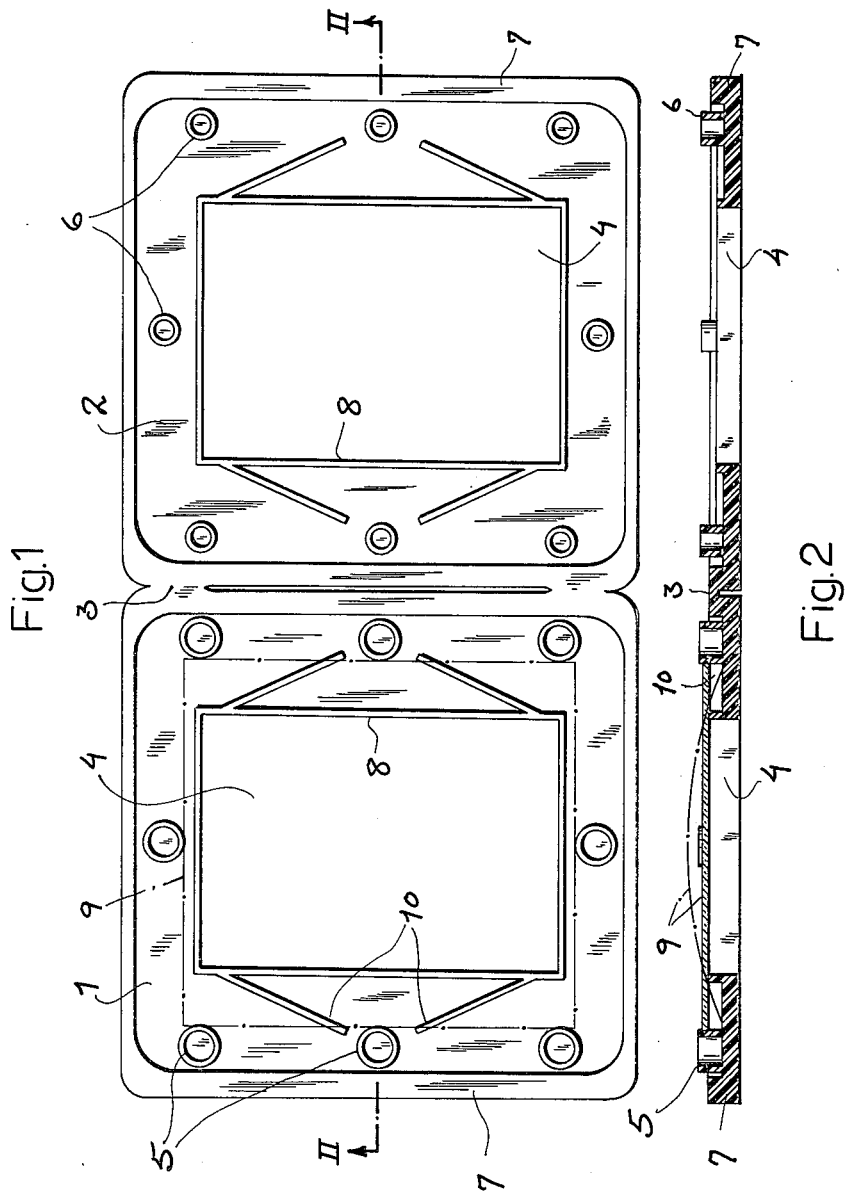

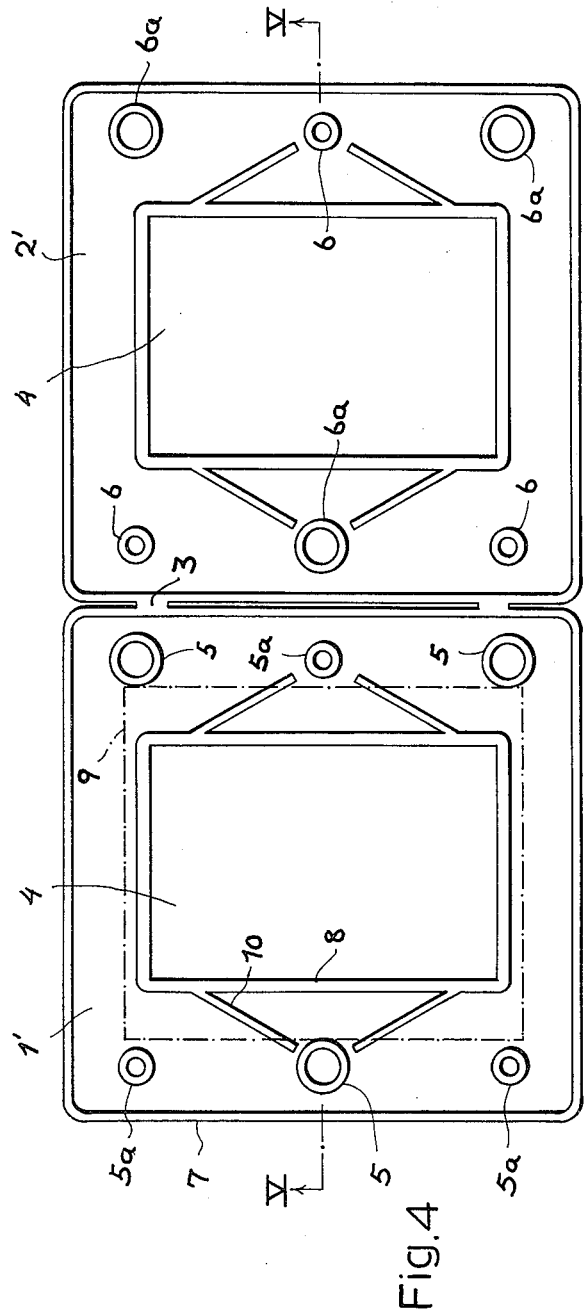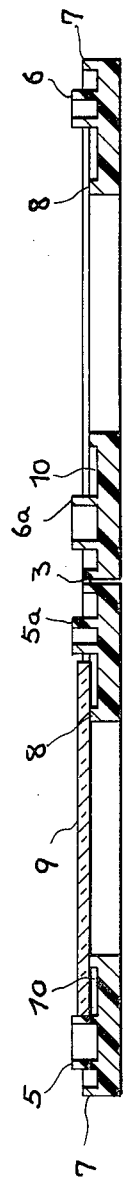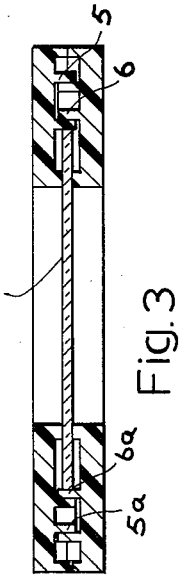

3,242,605
TRANSPARENCY MOUNT
Johann Otto Kleinschmidt, Darmstadt, Germany, assignor to Seary-Michelbach G.m.b.H., Darmstadt-St. Stephan, Germany, a corporation of Germany
Filed July 5, 1963, Ser. No. 292,966
Claims priority, application Germany, July 6, 1962, S 80,303
7 Claims. (Cl. 40—152)

My present invention relates to transparency mounts and, more particularly, to an improved transparency mount having a pair of detachably interconnectable frame members adapted to sandwich a transparency therebetween.

Heretofore, it has been the practice to prepare so-called "slides" by mounting a transparency or diapositive between a pair of paper frames together forming a transparency mount. These paper frames usually were permanently joined together by a pressure-sensitive or thermally activable adhesive. In many cases, however, such slides were unsatisfactory as a consequence of the natural flexibility of the mount and the inability to replace the transparency therewithin. Consequently, it has been proposed to provide frame members from a synthetic resin material and to form them along their peripheries with latching members capable of holding the frame portions in their closed condition with the transparency sandwiched therebetween. In a variant of this technique, one of the frame members was provided with throughgoing bores in which long studs provided on the other frame member could be lodged. The edge formations mentioned were frequently inconvenient to use since, in many cases, they interfered with satisfactory passage of the slide through a projector, particularly when the latter was provided with automatic feed devices. A similar disadvantage arose in devices wherein the frame member was provided with throughgoing bores, since these bores invariably resulted in discontinuities or recesses along the outer surface of the transparent mount which likewise interfered with satisfactory use of the slide in automatic projectors. This latter construction made use of members of uniform cross-section which were relatively massive.

It is the principal object of the present invention to provide an improved transparency mount whereby the aforementioned disadvantages can be obviated and which is suitable for use in slide projectors of all types without difficulty.

This object is attained, in accordance with the present invention, by providing a transparency mount which comprises a pair of juxtaposable releasably interlockable frame members, preferably composed of a synthetic resin material, provided with respective, generally centrally disposed, throughgoing substantially rectangular window openings registrable upon juxtaposition of the members and respective confronting inner surfaces formed with complementary, frictionally interengageable, mating locking projections extending transversely to the respective surfaces and forming releasable clamping means holding the frame members together and sandwiching the transparency therebetween. It is, therefore, an important aspect of the present invention that the locking formations do not project from only one of the members but, in contradistinction to earlier devices, are provided upon both juxtaposable members, within a depressed area of each member surrounding a transparency-supporting elevated surface on its side confronting the other member, the projections of each member extending in the direction of the other member whereby the need for throughgoing apertures adapted to receive studs can be eliminated.

Advantageously, these mating formations include female members formed by thin-walled tubular cylinders or rings of circular configuration, the projections mating therewith being formed as cylindrical elements whose outer diameters are substantially equal to the inner diameters of the ring and which are adapted to frictionally engage the inner walls of the latter. The thin-walled female elements or rings are, of course, also composed of the synthetic resin material constituting the frame members so that they are resiliently distensible in radial direction and are capable of clamping against the cylindrical male elements.

According to a further feature of this invention, these male cylindrical elements are not composed of relatively massive studs as is the case in earlier devices, but also have the configuration of thin-walled tubular cylinders having some degree of resilient compressibility in the radial direction, both sets of formations being, in this case, projecting rings of generally circular cross-section but of different diameter whereby the smaller-diameter rings can be received within those of larger diameter male. While it is possible, according to this invention, to provide all of the larger-diameter rings upon one of the members and all of the smaller-diameter rings upon the other frame member in registry with the rings of larger diameter upon juxtaposition of the members, it should be noted that it is also possible to provide some of the larger-diameter rings upon each of the frame members with the smaller-diameter rings likewise disposed upon both frame members but in complementary relationship. It will be apparent that this construction admits of a reliable interconnection of the two frame members and yet affords the possibility of a subsequent opening of the transparency mount for replacement of the diapositive. In accordance with a more specific feature of the present invention, both frame members are integral with one another and are hingedly interconnected along a common edge by a thin flexible web of the synthetic resin material integral with both of the members, the entire transparency mount being formed in a single injection-molding operation as a unitary body. In the event it is desirable to form the halves of the mount in a non-interconnected manner, it has been found to be advisable to dispose the mating formations in a mirror-symmetrical array to permit interchangeability of the frame members. This mirror symmetry need not be observed when both frame members are formed integrally with one another as previously mentioned.

Moreover, I have found that the improved mount should, advantageously, have each of its frame members provided with a respective outer ridge, bordering the periphery of the respective member and projecting in the direction of the other member for abutting contact with the outer ridge thereof, as well as an inner ridge bordering the respective window opening to form the aforementioned elevated surface for clamping a transparency between the inner ridges upon interlocking engagement of the members. The aforementioned outer ridge serves to stiffen the frame members along their peripheries especially when each of them is formed as a concave shell open in the direction of the other member. The inner or clamping ridges facilitate emplacement of the transparency and also serve to retain it in position as long as the mount is closed. The shell structure of the frame members is of particular importance when the mount is to be used in a slide projector since effective operation of the latter requires that the mount have a minimum thickness which cannot be attained with planar frames unless the members thereof are made relatively thick; this, however, inordinately increases the mass of the transparency and, in addition to being more costly as a consequence of the larger material consumption, renders the transparency mount unsuitable for use in rapid-action slide projectors because of its large mass.

The above and other objects, features and advantages of the present invention will become more readily apparent from the following description, reference being made to the appended drawing in which:

FIG. 1 is a plan view of a unitary transparency mount, according to the invention, in its open position;

FIG. 2 is a cross-sectional view thereof, taken along the line II—II of FIG. 1;

FIG. 3 is a cross-sectional view corresponding to that of FIG. 2 but showing the mount in its operative, closed position;

FIG. 4 is a view similar to FIG. 1 illustrating a modification of the invention; and FIG. 5 is a cross-sectional view taken along the line V—V of FIG. 4.

Prior to entering into a more detailed discussion of the invention with respect to the transparency mount illustrated in the drawing, it should be noted that the proportions shown therein have been somewhat exaggerated in order to provide an effective illustration of the elements of the mount. Thus, while FIGS. 2 and 5 show the frame members to be thick, it should be noted that they are, in fact, relatively flat bodies whose thickness in the closed condition ranges between substantially 2.4 and 3.0 mm. and preferably lies between 2.6 and 2.8 mm., inclusive.

The transparency mount of FIGS. 1–3 comprises a pair of integrally formed synthetic-resin frame members 1 and 2 hingedly interconnected at 3 by webs of the synthetic resin material whose thickness is a small fraction of that of the members and which are flexible. The unit can be produced by injection-molding techniques. Each of the frame members 1, 2 is formed with a respective central opening or window 4 of generally rectangular configuration, these openings registering upon juxtaposition and interlocking of the members to expose the central portions of a transparency 9 while masking its periphery. Members 1 and 2 are shown, in FIG. 2, to be upwardly concave shells, formed integrally with matingly engageable upstanding projections 5 and 6, respectively. The female formations 5 are relatively thin-walled hollow cylindrical rings adapted to receive the cylindrical male elements or studs 6, which are likewise hollow in this case so as to increase the resilient interlocking of the pairs of mating formations in the juxtaposed position of the members (FIG. 3), the complementary formations being confrontingly disposed at spaced locations in the depressed areas between the boundaries of opening 4 and the outer frame periphery. The outer surfaces of the frame members 1, 2 are thus free from the deep recesses and discontinuities of earlier devices and may be perfectly flat except for an embossed trade name or similar indicia which is more or less superficial and cannot limit the effectiveness of the mount when it is to be used in a slide projector.

It should be noted that the exceptionally long pins and mating throughgoing bores of earlier mounts have been eliminated in the present structure wherein the protruding formations 5, 6 extend axially only to a height in excess of the depth of the concavity of the respective shell, i.e. beyond the transparency supporting surfaces thereof, but not more than the total depth of the chamber formed between the frame members. The outer surfaces of members 1, 2 are, therefore, imperforate as seen in FIGS. 2 and 3.

Advantageously, the window openings 4 are each bounded by an inner ridge 8 which, in addition to stiffening the shell members, serves as a clamping surface in cooperation with the aligned ridge of the juxtaposed member for securing the transparency therebetween. Since there is some tendency for the transparency 9 to bend into, say, the position shown in broken lines in FIG. 2, ribs 10 are provided. These ribs extend linearly adjacent the ridges 8 and have their upper or contact faces coplanar therewith while forming additional stiffening or reinforcing elements. At least the large-diameter female formations 5 can be arrayed rectangularly (FIG. 1) and form centering means abutting the edges of the transparency (whose outline is shown by dot-dash lines in FIG. 1) for locating the latter. The faces of inner peripheral ridges 8 and ribs 10 lie below the juxtaposed faces of a respective outer peripheral ridge 7 forming a continuous flange along the sides of each of the members 1 and 2, these flanges maintaining the proper thickness of the mount. It will be noted that the ribs 10, which upon operative juxtaposition of the members 1, 2 register with one another, extend obliquely outwardly from the major sides of the rectangular windows 4 to adjoining sides of the rectangular transparency outline within the depressed areas which separate the peripheral ridges 7, 8. These depressed areas, in the interlocking position illustrated in FIG. 3, form clearances around the male elements 6 to accommodate those portions of the mating female elements 5 which project beyond the transparency-supporting surfaces of ridges 8 and ribs 10.

A transparency 9 can be inserted between the formations 5 of member 1 as indicated in FIG. 1 and the other frame member 2 pivoted into a position wherein it is juxtaposed with member 1. The two members can then be forced into interlocking engagement with the formations 5 and 6 resiliently yielding to frictionally secure the mount. To this end, the outer diameter of the male formations 6 can be substantially identical with the inner diameter of the female formations 5 and, preferably, only slightly greater, the interior surface of elements 5 being outwardly divergent or the outer surface of elements 6 being outwardly convergent to facilitate the resilient clamping. The elements 5, 6 can be spread apart to permit interchange of the transparencies.

In FIGS. 4 and 5, I show a modified mount wherein the members 1' and 2' are also formed with male projections 5a and female projections 6a, respectively, the mating formations being mirror-symmetrically disposed so that only a single type of frame member need be produced, if desired. It should be noted that an important concept of the present invention resides in the discovery that none of the projecting elements should be exceptionally more massive than the others to permit rapid setting of the mount and its removal from the dies. Advantageously, all of the wall thicknesses should range between substantially 0.5 mm. and, say, 1.2 mm., the ridge 8 having the somewhat larger wall thickness so as to decrease the pressure applied to the transparency and avoid cutting of the latter. For a transparency mount having a closed thickness of approximately 2.7 mm., the wall thickness of the shell members 1, 2 can be about 0.9 mm. while that of the formations 5, 6 ranges between this and 0.5 mm. Ridge 7 and ribs 10 can have thicknesses between substantially 0.5 and 0.7 mm. in order to provide effective reinforcement. By way of example, it may be noted that the outer diameter of rings 5 can be about 5 mm. while that of the cylindrical bodies 6 is on the order of 3.5 mm. flanges 7 and 8 having overall heights of about 1.35 mm. and 1.22 mm., respectively.

What is claimed is:

1. A transparency mount comprising a pair of juxtaposable and releasably interengageable frame members defining respective windows which register with each other in an operative interlocking position of said members, said members having confronting sides with inner and outer peripheral ridges separated by depressed areas, said inner ridges forming respective supporting surfaces for a transparency which are closely spaced from each other in said interlocking position, each of said members being further provided with a plurality of protruding formations distributed about its window and projecting from the depressed area thereof beyond its respective inner ridge for mating engagement with a confronting formation on the other member, each pair of mating formations consisting of a tubular female formation and a male formation receivable with close fit in said female formation, said male formation being surrounded by said depressed area with enough clearance to accommodate the projecting end of the corresponding female formation to a depth greater than the spacing of said supporting surfaces upon the clamping of a transparency therebetween.

2. A transparency mount as defined in claim 1 wherein said members are provided on said confronting sides with ribs of the same height as said inner ridges extending outwardly from the latter within said depressed areas for supporting overhanging portions of said transparency.

3. A transparency mount as defined in claim 2 wherein the ribs of said members register with each other in said interlocking position.

4. A transparency mount as defined in claim 1 wherein said members consist of synthetic resin and are integrally formed with a flexible web uniting adjoining edges thereof for hingedly interconnecting said members.

5. A transparency mount as defined in claim 1 wherein said members have substantially flat, imperforate faces on their sides opposite said confronting sides.

6. A transparency mount comprising a pair of juxtaposable and releasably interengageable frame members of synthetic resin defining respective windows which register with each other in an operative interlocking position of said members, said members having confronting sides with inner and outer peripheral ridges separated by depressed areas, said inner ridges forming respective supporting surfaces for a transparency which are closely spaced from each other in said interlocking position, each of said members being integrally formed with a plurality of protruding formations distributed about its window and projecting from the depressed area thereof beyond its respective inner ridge for mating engagement with a confronting formation on the other member, each pair of mating formations consisting of a cylindrically tubular female formation and a cylindrically tubular male formation receivable with close fit in said female formation, said male formation being surrounded by said depressed area with enough clearance to accommodate the projecting end of the corresponding female formation to a depth greater than the spacing of said supporting surfaces upon the clamping of a transparency therebetween, said windows being substantially rectangular, said formations being disposed along the edges of a rectangle larger than said windows defining the outline of said transparency, said members being formed on said confronting sides with ribs of the same height as said inner ridges but slightly lower than said outer ridges, said ribs extending obliquely outwardly from the major sides of each window to adjoining sides of said outline.

7. In a transparency mount composed of a synthetic resin and comprising a pair of juxtaposable substantially coextensive and releasably interengageable frame members defining respective windows registering with one another and having confronting surfaces framing said windows, the improvement wherein:
 (a) each of said surfaces is formed with a plurality of thin-walled tubular projections extending in the direction of the other surface and detachably engaging a corresponding thin-walled projection of the other surface;
 (b) the thin-walled tubular projections of one of said surfaces form male members while the thin-walled tubular projections of the other surface form female members receiving the corresponding male member;
 (c) said projections are constituted from the synthetic resin of said frame members in one-piece construction with the respective frame member; and
 (d) the outer diameter of each male member is at least equal to the inner diameter of the respective female member for clamping engagement thereby upon closure of the transparency mount.

References Cited by the Examiner
UNITED STATES PATENTS 2,874,498   2/1959   Butkevick _____ 40—152
2,959,882   11/1960  Krull _____ 40—152

FOREIGN PATENTS 1,163,657   4/1958   France.
 856,652   12/1960   Great Britain.

EUGENE R. CAPOZIO, Primary Examiner.
JEROME SCHNALL, Examiner.
WENCELSO J. CONTRERAS, Assistant Examiner.